March 20, 1956  H. C. DOANE  2,738,755

ILLUMINATABLE INDICATING DEVICES

Filed May 25, 1951

Inventor
Harry C. Doane
By Willits, Helmig & Baillio
Attorneys

United States Patent Office 2,738,755
Patented Mar. 20, 1956

2,738,755

ILLUMINATABLE INDICATING DEVICES

Harry C. Doane, Flint, Mich., assignor to General Motors Corporation, Detroit, Mich., a corporation of Delaware Application May 25, 1951, Serial No. 228,175

6 Claims. (Cl. 116—124)

This invention relates to illuminatable dials and more particularly to illuminatable dials for indicating the various positions of adjustment of the shift control means for automatic transmissions of motor vehicles.

When a motor vehicle is operated at night or in an unlighted garage or under other poor lighting conditions the operator often has difficulty in observing on unilluminated indicator dials the position of the shift control means for the transmission and therefore must rely on other means for this information. This may cause considerable confusion and inconvenience, especially when operating in traffic or in other places where quick decisions must be made and careful manipulation of the vehicle is essential.

One object of the present invention is to provide a novel and highly improved illuminatable dial which is clearly visible under all conditions of lighting.

Another object is to provide an illuminatable dial for indicating the various positions of adjustment of the transmission shift control means of a motor vehicle.

A further object is to provide a light transmitting dial having indicia thereon corresponding to the different positions of adjustment of the shift control means for an automatic transmission, a pointer carried by the shift control means movable across said dial to indicate thereon the position of said control means and means located at a position remote from said dial for illuminating the latter.

A still further object is to provide a light transmitting dial disposed partly within the steering column of a motor vehicle, and an incandescent lamp also extending into the interior of said column for illuminating said dial.

A still further object is to provide a translucent or transparent dial having indicia thereon and a curved light reflecting surface on said dial for directing and evenly distributing the light from a remote source over the entire area of said dial.

A still further object is to provide an illuminatable indicator dial which is simple in construction, economic in manufacture and highly efficient in operation.

Other and further objects will become apparent as the description of the invention progresses.

Figure 1:
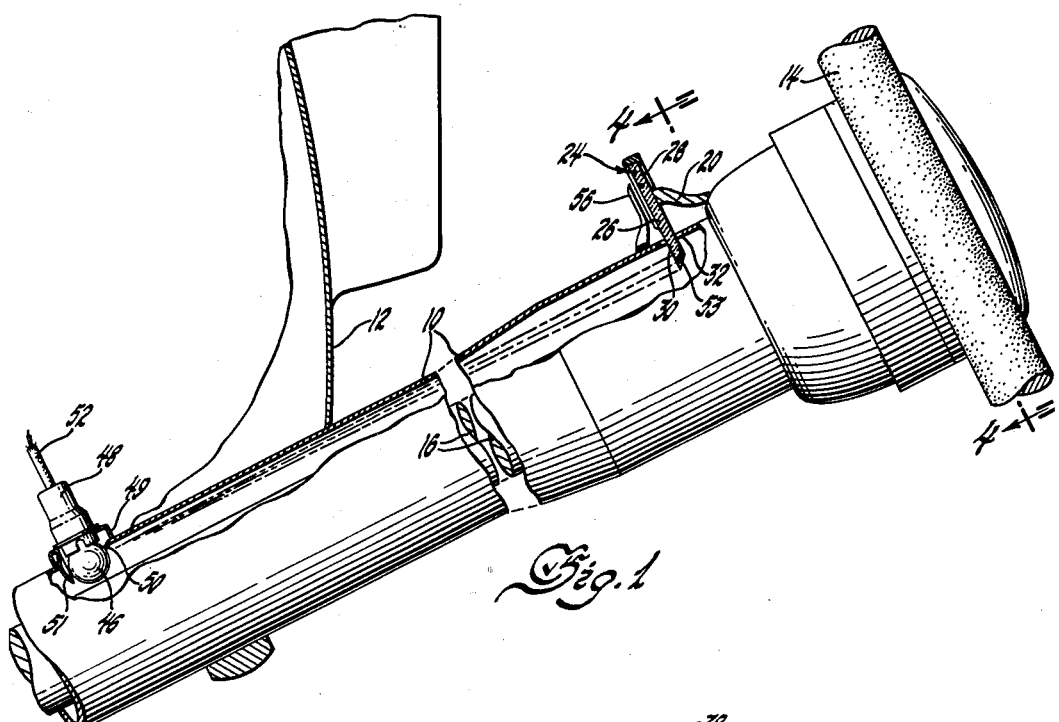
Fig. 1 is an elevational view, partly in section, of a steering column of a motor vehicle, showing my improved illuminatable dial and the associated illuminating light source therefor, certain parts being broken away to more clearly illustrate the structure and arrangement of the parts.
Figure 2:
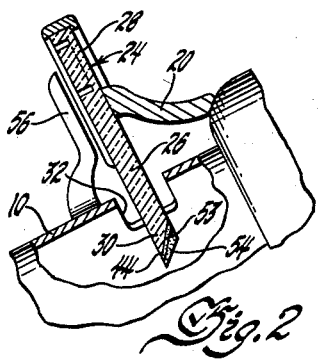
Fig. 2 is an enlarged view, partly in section, of my improved illuminatable dial and the pointer associated therewith.
Figure 4:
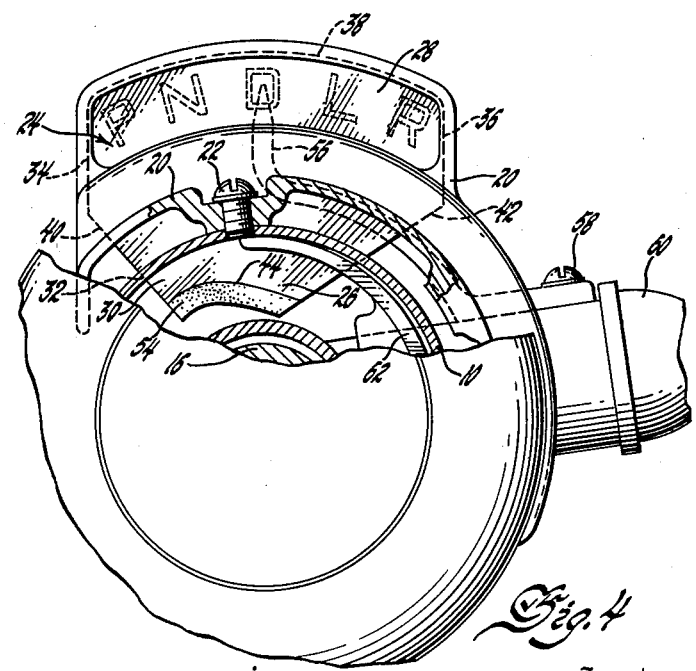
Fig. 4 is an enlarged view, partly in section, taken substantially along line 4—4 of Fig. 1.
Figure 3:
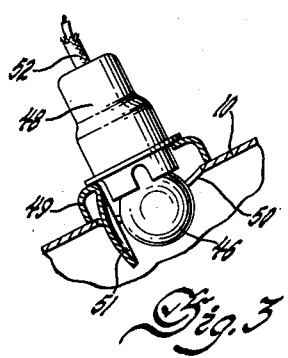
Fig. 3 is a side view, partly in section, of the illuminating means associated with my dial.

Referring to the drawing the numeral 10 designates a stationary steering column for a motor vehicle which inclines downwardly and forwardly beneath the instrument panel 12 of said vehicle in the usual fashion. A steering wheel 14 is supported at the upper end of column 10 and has secured thereto the upper end of a steering shaft 16 which extends centrally of the said steering column and in substantially concentric relation therewith.

Mounted in any suitable manner in a bracket 20 secured to steering column 10 near the upper end of the latter by machine screws 22 or other means is an illuminatable dial 24. Dial 24 comprises a flat, relatively thin body portion 26 and may be constructed of the thermoplastic methyl-methacrylate resin commonly known as "Lucite" or of any other suitable material. Dial 24 is disposed transversely of steering column 10 and the body portion 26 thereof comprises a relatively wide outer portion 28 and a relatively narrow inner portion 30. The inner portion 30 extends through a transverse slot 32 provided near the upper end of steering column 10 and a part thereof lies interiorly of said column. The outer portion 28 is so arranged as to be clearly visible to the operator of the vehicle and has formed or cut therein the letters P, N, D, L and R which indicate, respectively, the park, neutral, drive, low gear and reverse positions of adjustment of the associated automatic transmission.

The relatively large outer portion 28 of dial 24 is provided with straight substantially parallel side edges 34 and 36 which terminate at their outer ends in a transverse convex edge 38. The inner ends of side edges 34 and 36 terminate in inwardly converging edges 40 and 42, respectively, which in turn terminate in a substantially concave transverse edge 44.

Dial 24 is illuminated by an incandescent lamp 46 mounted in an electric fixture 48 secured to column 10 in any suitable manner, as by a bracket 49 at a point remote from dial 24. Lamp 46 extends into the interior of column 10 through an opening 50 provided in the latter and a reflector 51 secured to fixture 48 and mounted directly behind the said lamp assists in directing the light rays of the latter toward the dial 24. One terminal of lamp fixture 48 may be connected to the ignition circuit of the vehicle (not shown) by a conductor 52 and the other terminal to ground by its connection with steering column 10 through bracket 49. The bevelled surface 53 of concave edge 44 of dial 24 is disposed at such an angle that the rays from lamp 46 striking it are deflected outwardly through light transmitting body 26. The surface 53, also, is so curved that the light deflected thereby is evenly distributed over the entire area of the body 26 of dial 24. It therefore is seen that the light so deflected and distributed together with the illumination of the remaining area of the inner end 30 of dial 24 effectively illuminates the said dial so that the indicia formed thereon are clearly visible under all conditions of lighting. In order to render light deflecting and distributing surface 53 more effective, it may be provided with an opaque white or other good light deflecting coating as shown at 54. Instead of forming or cutting the letters in the body 26 of the dial they may be painted or otherwise placed thereon so as to stand out prominently in relief.

A pointer 56 is secured by machine screws 58 or other means to the shift lever 60 associated with the control mechanism (not shown) of an automatic transmission. The pointer 56, is mounted to swing beneath dial 24 and is visible therethrough. It is apparent, however, that the pointer 56 may be arranged so as to swing over the dial or otherwise if it is so desired, without departing from the invention. The lever 60 is secured to a control member 62 mounted within column 10 in concentric relation therewith, the said lever extending through an enlarged slot (not shown) in said column. Therefore upon actuation of lever 60 to adjust the transmission controls pointer 56 moves therewith and indicates on dial 24 the different positions of adjustment said lever and the associated transmission controls.

From the foregoing description it is seen that a simplified and highly improved device has been provided which clearly indicates the position of the transmission controls under all conditions of lighting. The illuminating means for the dial are provided within the steering column and therefore only the illuminated dial itself is visible to the operator. The indirect method of illuminating the dial 24 described herein not only provides effective illumination therefor but obviously also eliminates glare. It is also evident that by my improved device the light source may be located at a position on the steering post proper remote from the dial, thereby not only reducing the length of the electric conductors required but also eliminating bulges in the steering post to accommodate the incandescent lamp and other associated parts. It is also clear that by mounting the incandescent lamp at the position shown it is hidden from view and yet accessible for replacement.

While the invention has been shown and described in connection with dials for indicating the positions of the controls for automatic transmissions it is apparent that it is equally adapted for use with dials employed for other purposes. The invention is also adapted for use in connection with illuminatable displays used for advertising, signalling and for numerous other and varied purposes. It is also apparent that the single embodiment shown and described herein is subject to modification and to changes in details without departing from the invention. It therefore is to be understood that it is not intended to limit the invention to the construction disclosed but only by the scope of the claims which follow.

What is claimed is:

1. In a device of the class described, the combination of an opaque elongated tubular member having a transverse slot therein, a light transmitting dial extending through said slot in such a manner that a portion thereof lies within said tubular member and a second portion lies outside said member, an incandescent lamp extending into the interior of said tubular member in longitudinally spaced relation with said dial, indicia on said second portion of said dial, and a curved beveled surface on the inner edge of said first mentioned portion of said dial for directing and distributing light from said lamp over the entire area of said second mentioned portion to illuminate the latter whereby the indicia thereon becomes clearly visible.

2. In a device of the class described, the combination of an opaque tubular member having a transverse slot therein, a light transmitting dial extending through said slot in such a manner that a portion thereof lies within said tubular member and a second portion lies outside said member, an incandescent lamp extending into the interior of said tubular member in longitudinally spaced relation with said dial, indicia on said second portion of said dial, a concave beveled surface on the inner edge of said first mentioned portion of said dial for directing and distributing light from said lamp over the entire area of said second mentioned portion to illuminate the latter, light reflecting means for directing light from said lamp onto said first mentioned portion, and a pointer movable relative to said dial in cooperative relation with the said indicia thereon.

3. In a device of the class described, the combination of an illuminatable dial having indicia thereon corresponding to the different positions of adjustment of the shift control means for an automatic transmission, a vehicle steering column, means for mounting said dial on said steering column in such a manner that a portion thereof extends interiorly thereof, an incandescent lamp mounted on said steering column and extending into the interior thereof, means comprising a concave beveled edge provided on the said portion of said dial extending into said column for deflecting and distributing the light rays from said lamp over the entire area of said dial, and pointer means carried by said shift control means for indicating the positions of the latter on said dial.

4. In a device of the class described, the combination of a light transmitting dial having indicia thereon corresponding to the park, neutral, drive, low gear and reverse positions of adjustment of the shift control means for an automatic transmission, a vehicle steering column having a transverse slot therein, means for supporting said dial on said column in such a manner that a portion thereof extends through said slot and into the interior of said column, an incandescent lamp mounted on said column and extending into the interior thereof, a beveled surface provided on one edge of the portion of said dial extending interiorly of said column for deflecting and distributing the light from said lamp over the entire area of said dial and pointer means carried by said shift control means for indicating the position of the latter on said dial.

5. In a device of the class described, the combination of a light transmitting dial having indicia thereon corresponding to the different positions of adjustment of the shift control means of an automatic transmission, a tubular vehicle steering column having a transverse slot provided therein, a bracket secured to said steering column for supporting said dial in such a manner that a portion thereof extends through said slot and into the interior of said column, the indicia bearing portions of said dial extending outwardly of said column, an incandescent lamp secured to said column and extending into the interior thereof, a curved beveled surface on the inner end of the portion of said dial extending into said column for deflecting the light rays from said lamp and distributing them over the entire area of said dial, and pointer means carried by said shift control means for indicating the different positions of adjustment of the latter on said dial.

6. In a device of the class described, the combination of a light transmitting dial comprising a relatively flat body portion having an extended outer portion and a relatively narrow inner portion, said outer portion having indicia thereon corresponding to the park, neutral, drive, low gear and reverse positions of adjustment of the shift control means for an automatic transmission, a tubular vehicle steering column having a transverse slot provided near an end thereof, a mounting bracket for said dial secured to said steering column, said dial being so mounted on said bracket that the said inner portion extends through said slot and into the interior of said column, an incandescent lamp mounted to illuminate the interior of said column, reflector means for directing the rays of said lamp onto the said inner portion of said dial, a concave beveled surface on the inner end of said inner portion for deflecting and distributing the light rays from said lamp over the area of said dial thereby illuminating the indicia carrying portion thereof, and a pointer carried by said shift control means for indicating the different positions of adjustment of the latter on said dial.

References Cited in the file of this patent

UNITED STATES PATENTS

| | | |
|---|---|---|
| 2,009,210 | Scantlebury | July 23, 1935 |
| 2,019,976 | Huebscher | Nov. 5, 1935 |
| 2,091,342 | Van Bloem | Aug. 31, 1937 |
| 2,097,625 | Langlotz | Nov. 2, 1937 |
| 2,287,605 | Dickson | June 23, 1942 |
| 2,317,182 | Dickson | Apr. 20, 1943 |
| 2,593,810 | Sullivan | Apr. 22, 1952 |

FOREIGN PATENTS

| | | |
|---|---|---|
| 214,644 | Switzerland | Aug. 1, 1941 |
| 402,825 | Great Britain | Dec. 11, 1933 |